United States Patent
Shah et al.

(10) Patent No.: US 7,396,165 B2
(45) Date of Patent: Jul. 8, 2008

(54) COUNTERBORE BASE MEMBER FOR FERRULE-TYPE OPTICAL CONNECTOR

(75) Inventors: Jignesh Shah, Sunnyvale, CA (US); Subra Nagarajan, Livermore, CA (US); Ramesh Sundaram, Fremont, CA (US)

(73) Assignee: Finisar Corporation, Sunnyvale, CA (US)

( * ) Notice: Subject to any disclaimer, the term of this patent is extended or adjusted under 35 U.S.C. 154(b) by 546 days.

(21) Appl. No.: 10/697,733

(22) Filed: Oct. 30, 2003

(65) Prior Publication Data
US 2004/0120655 A1    Jun. 24, 2004

Related U.S. Application Data

(60) Provisional application No. 60/423,011, filed on Nov. 1, 2002.

(51) Int. Cl.
G02B 6/36 (2006.01)
(52) U.S. Cl. .................. 385/78; 385/76; 385/77
(58) Field of Classification Search ............. 385/66, 385/78, 84
See application file for complete search history.

(56) References Cited

U.S. PATENT DOCUMENTS

| | | | | |
|---|---|---|---|---|
| 4,186,999 A | * | 2/1980 | Harwood et al. ............ 385/66 |
| 4,666,243 A | * | 5/1987 | Rogstadius et al. .......... 385/73 |
| 4,781,429 A | * | 11/1988 | Cartier ..................... 385/84 |
| 5,511,140 A | * | 4/1996 | Cina et al. .................. 385/93 |
| 5,542,015 A | * | 7/1996 | Hultermans ................ 385/60 |
| 5,858,161 A | * | 1/1999 | Nakajima et al. .......... 156/293 |
| 6,017,154 A | * | 1/2000 | Carlisle et al. ............. 385/86 |
| 6,357,929 B1 | | 3/2002 | Roehrs et al. |
| 6,464,402 B1 | * | 10/2002 | Andrews et al. ............ 385/53 |
| 6,485,189 B1 | | 11/2002 | Gilliland et al. |
| 6,501,876 B1 | * | 12/2002 | Okada et al. ............... 385/31 |
| 6,547,450 B2 | * | 4/2003 | Lampert .................... 385/78 |
| 6,629,780 B2 | * | 10/2003 | Kang et al. ................. 385/60 |
| 6,714,366 B2 | | 3/2004 | Wisecarver et al. |
| 2001/0030422 A1 | * | 10/2001 | Kerr et al. ................. 285/382 |

* cited by examiner

*Primary Examiner*—Sung H Pak
(74) *Attorney, Agent, or Firm*—Workman Nydegger

(57) ABSTRACT

An optical connector includes a base member having a first hollow bore extending from a first end toward a second end, and a recess coaxially aligned with the first hollow bore. The recess has a first internal perimeter and a second internal perimeter. The first perimeter is smaller than said second perimeter. The base member can have a post extending up from a bottom of the recess. The first hollow bore passes through the past and terminates at an end of the post. The post can have an end that terminates substantially in alignment with at least a portion of a termination region disposed between the first internal perimeter and the second internal perimeter.

19 Claims, 2 Drawing Sheets

US 7,396,165 B2

COUNTERBORE BASE MEMBER FOR FERRULE-TYPE OPTICAL CONNECTOR

CROSS-REFERENCE TO RELATED APPLICATIONS

This application claims priority to and the benefit of U.S. Provisional Patent Application No. 60/423,011, filed on Nov. 1, 2002, and entitled "Counterbore Base Member for Ferrule-type Optical Connector", which is incorporated herein by reference in its entirety.

BACKGROUND OF THE INVENTION

1. The Field of the Invention

The present invention relates to optical connectors, and more particularly to ferrule-type plug/receptacle optical connectors.

2. The Relevant Technology

Ferrule-type plug/receptacle optical connectors are well known in the art. These connectors are typically used to position two optical waveguides, such as optical fibers, so that light can propagate between the two waveguides or between the optical waveguide and an optical component or subassembly. The optical connectors can be repeatedly removed and reconnected to each other while providing an optical alignment therebetween to minimize connection losses.

A common ferrule-type optical connector, designated generally as reference numeral 100, is illustrated in FIGS. 1A and 1B. As shown in FIG. 1B, connector 100 includes a base 102 that receives a ferrule 104. The base 102 includes a central bore 106 that extends from a first end 108 toward a second end 124 having an annular alignment recess 109 formed therein. The recess 109 is centered about bore 106. The recess 109 includes a bottom wall 112 and a sidewall 114. A post member 110 extends from bottom wall 112 and towards a center of recess 109, with bore 106 running through post member 110. The sidewall 114 of recess 109 has a height above bottom wall 112 that is greater than that of post member 110. A retention channel 116 is formed in a lateral outer surface of base 102 that acts as the mating structure to receive a portion of the housing/shell (not shown) of the transceiver module that contains the receiver optical sub-assembly (ROSA) and transmitter optical sub-assembly (TOSA) (not shown).

The ferrule 104 received by base 102 has a generally cylindrical shape, with an annular outer sidewall 118 and a mating surface 120 on an end 126. A central bore 122 runs through ferrule 104. The ferrule 104 inserts into recess 109 of base 102 until ferrule mating surface 120 engages with recess bottom surface 112, as is shown in FIG. 1A. The outer diameter of ferrule sidewall 118 is slightly larger than an inner diameter of recess sidewall 114, so that there is an interference fit therebetween. This interference fit ensures that ferrule 104 is correctly positioned both laterally and axially when mating surface 120 engages bottom surface 112. The combination of the mating surfaces and the interference fit between base 102 and ferrule 104 ensures that the bores 106/122 (and therefore optical elements and waveguides disposed therein) are precisely aligned with each other.

One problem that has been discovered is that many times the lateral forces of the interference fit between base 102 and ferrule 104 causes deformation of ferrule 104. This deformation results in bore 122 actually curving inwardly opposite the contact area between sidewall surfaces 114/118. This curvature can interfere with the waveguide and/or other optical components mounted in bore 122. It can also prevent these components from being properly positioned relative to bore 106 of base 102 and any optical elements therein.

One solution can be to reduce the lateral forces of, or completely eliminate, the interference fit between ferrule 104 and base 102. However, any free space between sidewall surfaces 114/118 allows lateral movement between base 102 and ferrule 104 that misaligns bores 106/122. This can cause misalignment of the optical components with associated degradation of alignment and optical coupling.

BRIEF SUMMARY OF THE INVENTION

There is a need for an optical ferrule-type connector that does not deform the ferrule sidewall portion adjacent the ferrule bore portion(s) containing optical elements therein. Any modification to the base (or ferrule) to solve the above-identified problem needs to be done in a manner that is compatible with standard ferrules (or bases). The present invention solves the aforementioned problems by using a ferrule receptacle base that exerts significant lateral forces for an interference fit only on the portion of the ferrule that is dedicated to receiving the post portion of the receptacle base.

The optical connector of the present invention includes a base member having a first hollow bore extending from a first end toward a second end, and a recess coaxially aligned with the first hollow bore. The recess has a first internal perimeter and a second internal perimeter. The first perimeter is smaller than said second perimeter. The base member can have a post extending up from a bottom of the recess. The first hollow bore passes through the past and terminates at an end of the post.

The optical connector is adapted to receive ferrules of various types, including, but not limited to LC, ST, SC, and FC connectors. The post can have an end that terminates substantially in alignment with at least a portion of a termination region disposed between the first internal perimeter and the second internal perimeter.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE EXEMPLARY EMBODIMENTS

The present invention is a ferrule-type optical connector, wherein the base member thereof eliminates significant lateral forces exerted on any portion of the bore of the connecting ferrule that could contain optical elements that could be adversely affected by such lateral forces. The invention is illustrated using one type of connector. It should be appreciated, however, that the principles of the invention disclosed herein can be applied to other known optical connector types, including, but not limited to, LC, ST, SC, and FC varieties, and other cross-sectional shapes or types of connectors. The choice of the one type of connector shown in the exemplary embodiment is for illustrative purposes only. The type of connector used dictates its dimensions, the size and configuration of the lateral surface used to engage with the fastening device of the ferrule member (i.e. engagement channel), and its general shape (e.g. circular, square, rectangular, etc.).

Figure 1A:
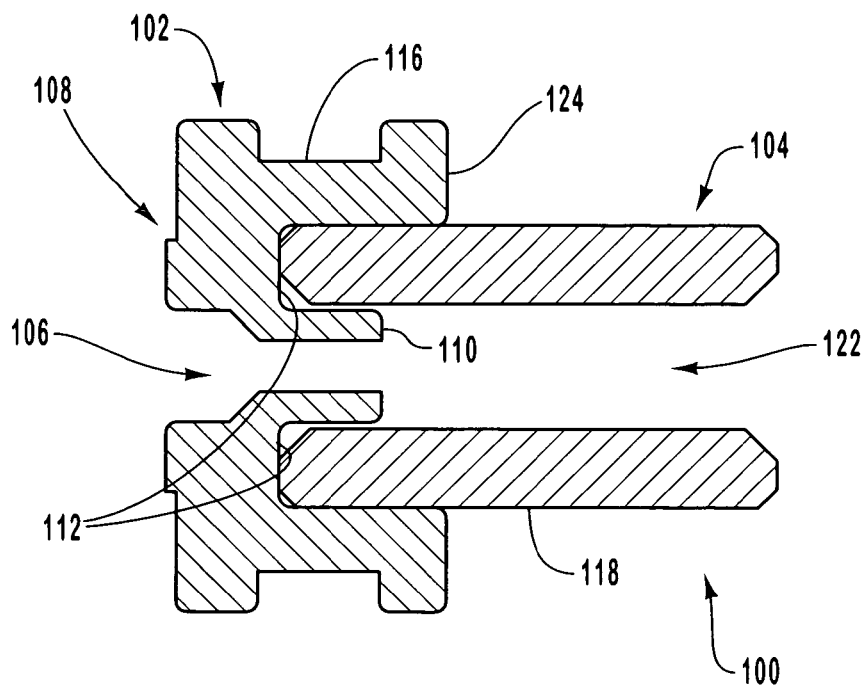
FIG. 1A is a cross sectional view of a conventional optical connector.
Figure 1B:
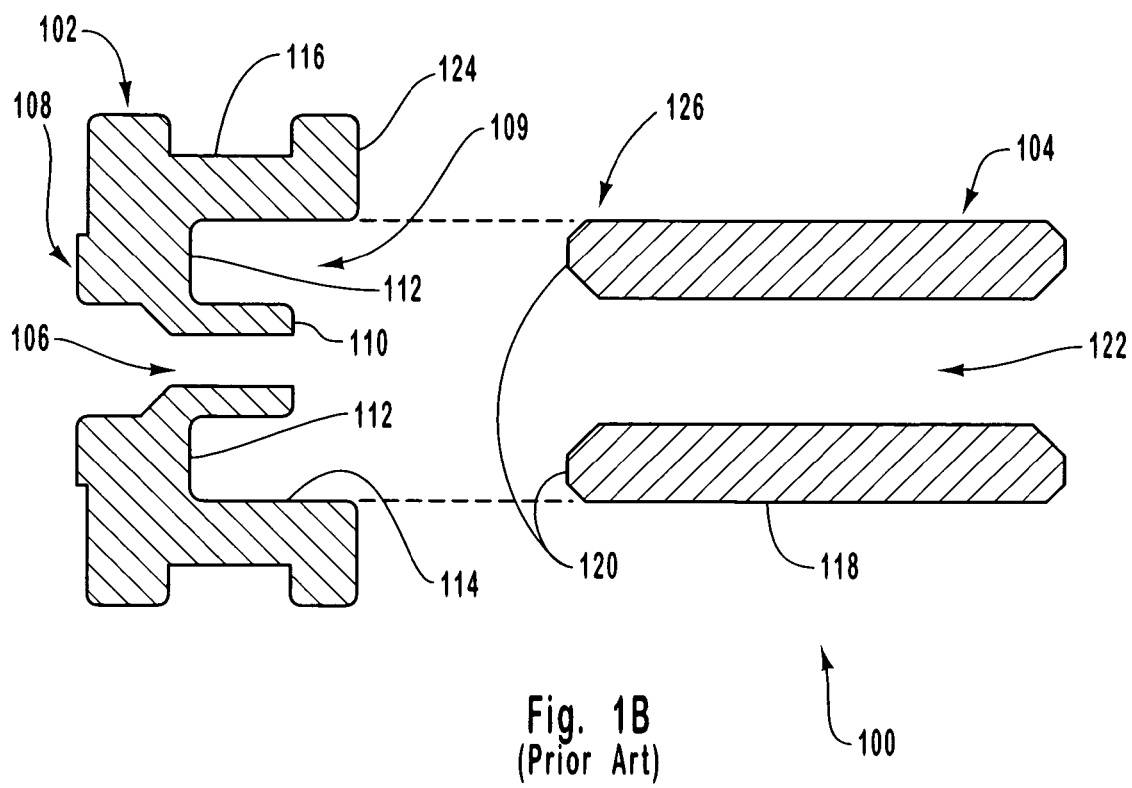
FIG. 1B is a cross sectional view of the conventional optical connector of FIG. 1A in its disconnected orientation.
Figure 2C:
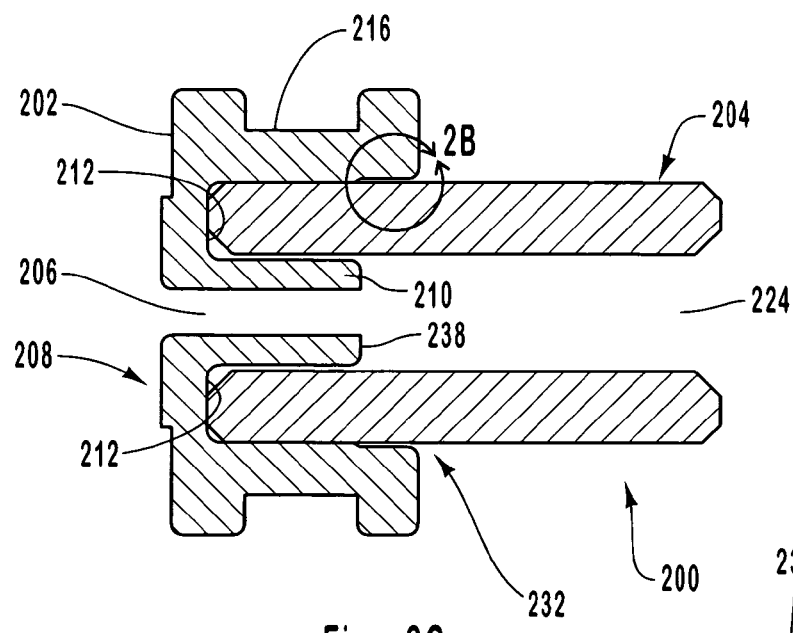
FIG. 2C is a cross sectional view of the optical connector of FIG. 2A in its connected orientation.
Figure 2B:
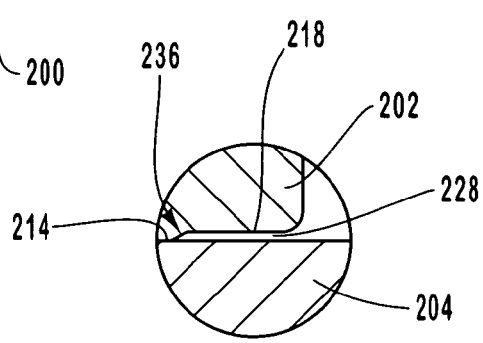
FIG. 2B is a close-up of a highlighted section of FIG. 2C in accordance with the present invention.
Figure 2A:
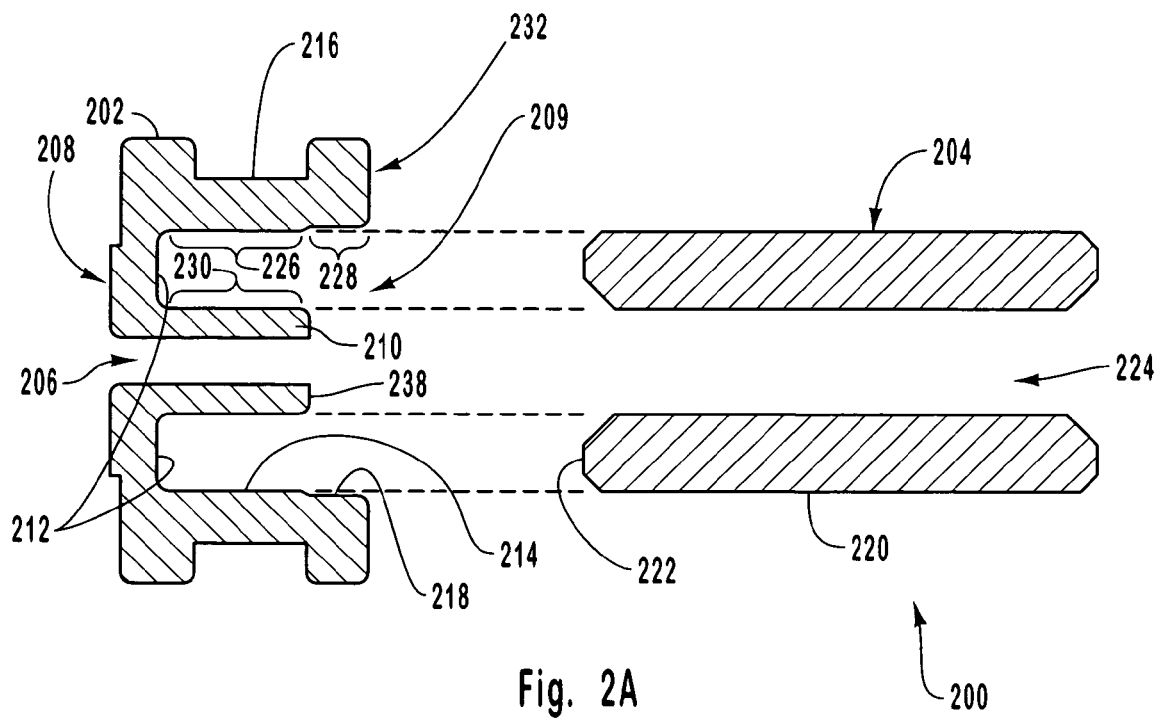
FIG. 2A is a cross sectional view of an exemplary embodiment of an optical connector in its disconnected orientation in accordance with the present invention.

A ferrule-type plug/receptacle optical connector in accordance with one aspect of the present invention is illustrated in FIGS. 2A through 2C, and designated generally as reference numeral 200. This connector 200 includes a base receptacle member 202 that connects with a ferrule 204. Base member 202 can be formed from ceramic, plastic, metal, composite, or other materials having the appropriate mechanical characteristics. Ferrule 204 can be any standard ferrule and function as a LC, ST, SC, and/or FC connector based upon the inner diameter, the outer diameter, and the length of ferrule 204. Additionally, ferrule 204 can be any other type of connector specifically designed to engage with base member 202 and based upon.

As shown in FIG. 2A, base member 202 includes a central bore 206 that extends from a first end 208 of base member 202 toward a second end 232 of base member 202. Central bore 206 allows light to be transmitted through base member 202. An annular alignment recess 209 is formed in its top surface centered about bore 206. The recess 209 includes a bottom wall 212, a lower sidewall 214, and an upper sidewall 218. A post member 210 extends from bottom wall 212 and into a center of recess 209, with bore 206 running through post member 210.

The lower sidewall 214 of recess 209 has a height 226 above bottom wall 212 that is lesser than or equal to a height of post member 210, as indicated by numeral 230. Upper sidewall 218 is adjacent a top of recess 209 and is generally higher above bottom wall 212 than the top of post 210. Upper sidewall 218 has a diameter or perimeter that is greater than a diameter or perimeter of lower sidewall 214. Stated another way, recess 209 has a stepped configuration with two regions having differing diameters; one region defined by lower side wall 214 and one region defined by upper side wall 218. A termination region 236 of lower side wall 214 is either generally aligned with an end 238 of post 210, disposed closer to bottom wall 212 of recess 209 than end 238 of post 210, or disposed further from bottom wall 212 of recess 209 than end 238 of post 210. As shown in FIG. 2B, this termination region 236 can have an angular configuration, such that there is a gradual change in the diameter of recess 209 (FIG. 2A) between lower side wall 214 and upper side wall 218. In another configuration, termination region 236 provides a stepped configuration, where the termination point of lower side wall 214 is substantially the same as the beginning point of upper side wall 218. Various other configurations are possible as known to those skilled in the art.

A retention channel 216 is formed in the lateral outer surface of base member 202. The retention channel 216 provides a structure that acts as the mating structure to receive a portion of the housing/shell (not shown) of a transceiver module that contains the receiver optical sub-assembly (ROSA) and transmitter optical sub-assembly (TOSA) (not shown). The configuration of retention channel 216 can vary based upon the type of connecting mechanism used to fixably or releasably connect base 202 to a housing/shell (not shown) contain the TOSA or ROSA.

In an exemplary embodiment, ferrule 204 is cylindrical in shape, with an annular outer sidewall 220 and a mating surface 222 on its end. A central bore 224 runs through the center of ferrule 204 for transmitting light therethrough. As shown in FIG. 2C, ferrule 204 inserts into alignment recess 209 of base member 202 until ferrule mating surface 222 engages with recess bottom surface 212. The outer diameter of ferrule sidewall 220 is slightly larger than the inner diameter of lower sidewall 214, so that there is an interference fit therebetween. This interference fit ensures that the connectors are positioned correctly both laterally and axially when mating surface 222 engages bottom surface 212. The combination of the interference fit and mating surfaces between the components ensures that the bores 206, 224 (and therefore any optical elements disposed therein) are aligned precisely with each other.

The larger circumference of upper sidewall 218 ensures that any lateral force exerted onto ferrule sidewall 220 due to the interference fit therebetween is exerted only on a portion of ferrule 204 that does not contain any optical element that would be adversely affected by any deformation of ferrule sidewall 220. This is because upper sidewall 218 does not engage with ferrule 204, or, if it does, the lateral force exerted thereby is significantly less than that exerted by lower sidewall 214. In the illustrated configuration, a gap is formed between upper sidewall 218 and ferrule 204.

Since post 210 inserts into a portion of bore 224 equal to the height of post 210, that portion of bore 224 cannot contain optical elements. Therefore, by having upper sidewall 218 extending toward bottom wall 212 a distance so that an end to upper sidewall 218 is at least even with a top 238 of post 210, lower sidewall 214 cannot exert any deforming lateral force to any portion of ferrule sidewall 220 containing optical elements that could be adversely affected by such lateral forces. The lower sidewall 214 exerts interference fit lateral forces only to that portion of the ferrule sidewall 220 reserved for receiving post 210.

The optical elements envisioned for bores 206 and 224 include optical fibers, and/or other optical elements such as lenses or waveguides, used to couple light into and out of optical fibers. In the case of an optical fiber in bore 224, the optical, fiber would terminate with an end located adjacent to, and nearly or actually abutting against, the top of post 210 so that light traversing through bore 206 can be coupled into and out of the optical fiber with very little coupling loss.

The present invention solves the ferrule deformation problem without changing the overall dimensions of base member 202, including post 210, recess bottom wall 212, lower sidewall 214, and retention channel 216. Thus, any ferrule-type base member optical connector having an engagement recess extending above a center post can be modified according to the present invention and still be compatible with the corresponding ferrules designed to engage therewith. No modification need be done to standard ferrule portions of optical connectors to connect with base members having a design according to the present invention.

It is to be understood that the present invention is not limited to the sole embodiment described above and illustrated herein, but encompasses any and all variations falling within the scope of the appended claims. For example, there are many styles of optical ferrule connectors that include a base member with a center bore terminating at the top of a post disposed in an alignment recess where the recess outer wall engages a ferrule with an interference fit. The scope of the present invention includes forming a notch in the upper sidewall to prevent deformation of the ferrule and interference with optical components therein, no matter what the general shape of the ferrule and the alignment recess (e.g. square, oval, round, rectangular, polygonal, etc.).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A base member for a ferrule-type optical connector, said base member having:
    a first hollow bore extending from a first end toward a second end; and
    a recess coaxially aligned with said first hollow bore, said recess having a first internal perimeter, and a second internal perimeter, wherein said first perimeter is smaller than said second perimeter, wherein said recess is configured to receive a ferrule in friction-fit engagement with a surface of the first perimeter, wherein a termination region is disposed between said first internal perimeter and said second internal perimeter.

2. The base member of claim 1, wherein a post extends from a bottom of said recess.

3. The base member of claim 2, wherein said first hollow bore passes through said post and terminates at an end of said post.

4. The base member of claim 1, wherein a post extends from a bottom of said recess, said post having an end that terminates substantially in alignment with at least a portion of a termination region.

5. The base member of claim 1, wherein said first internal perimeter is sized to friction-fit a ferrule.

6. The base member of claim 1, wherein said second internal perimeter is sized to form a gap between a ferrule disposed in said recess and said second internal perimeter, said gap reducing frictional contact between the base member and the ferrule.

7. The base member of claim 1, wherein said base member receives a ferrule selected from the group consisting of a LC, ST, SC, or FC connector.

8. An optical connector adapted to receive a ferrule member therein, the ferrule member having a first hollow bore formed therein, a side surface and an end with a mating surface, said optical connector comprising:
    a base member having an alignment recess, said alignment recess comprising:
    a bottom wall,
    a post member extending up from said bottom wall to a first height, a second bore extending through said post member, and
    a sidewall having a first portion extending from said bottom wall to a second height that is lesser or equal to said first height, said first portion having a first perimeter, and a second portion extending from said sidewall first portion to a top of said alignment recess, said second portion having a second perimeter larger than said first perimeter, wherein said recess receives the ferrule in friction-fit engagement with said first portion.

9. The optical connector of claim 8, wherein said post member extends from said bottom wall of said alignment recess, said post member having an end that terminates substantially in alignment with at least a portion of a termination region disposed between said first portion and said second portion.

10. The optical connector of claim 9, wherein said first portion and said second portion have a stepped configuration.

11. The optical connector of claim 9, wherein said termination region creates a gradual change in a diameter of said alignment recess.

12. The optical connector of claim 8, wherein a gap forms between said second portion and the ferrule.

13. The optical connector of claim 8, wherein the ferrule is selected from the group consisting of a LC, ST, SC, or FC connector.

14. The optical connector of claim 8, wherein a lateral force of the interference fit between said first portion and the ferrule exceeds any lateral force exerted between said second portion and the ferrule.

15. The optical connector of claim 14, wherein said second portion is dimensioned to not contact the ferrule when said interference fit is formed.

16. The optical connector of claim 8, wherein said post member inserts into the first bore when said interference fit is formed between the ferrule and said alignment recess in order to align the first bore and said second bore.

17. The optical connector of claim 16, wherein said alignment recess is generally circular in shape.

18. A connector comprising:
    a based member comprising:
        a hollow bore extending from a first end to a second end;
        a recess defining a first outer perimeter and a second outer perimeter, the first outer perimeter being larger than the second outer perimeter, the recess being configured to receive a LC, ST, SC, or FC connector, the first outer perimeter being larger than an outer perimeter of the LC, ST, SC, or FC connector and the second outer perimeter being smaller than the outer perimeter of the LC, ST, SC, or FC connector such that the second outer perimeter receives the LC, ST, SC, or FC connector in a friction-fit engagement; and
        a termination region between the first outer perimeter and the second outer perimeter, wherein the termination region creates a slanted surface between the diameter of the first outer perimeter and the second outer perimeter such that the LC, ST, SC, or FC connector is guided into the second outer perimeter by the transition region.

19. The optical connector of claim 8, wherein the base member, bottom wall, post member, and sidewall are unitarily formed.

* * * * *